United States Patent
Kalbe et al.

(10) Patent No.: US 10,081,134 B2
(45) Date of Patent: Sep. 25, 2018

(54) PROCESS FOR PRODUCING FIBER COMPOSITE MOLDINGS

(71) Applicant: BASF SE, Ludwigshafen (DE)

(72) Inventors: Michael Kalbe, Weinheim (DE); Rainer Scheidhauer, Hassloch (DE)

(73) Assignee: BASF SE, Ludwigshafen (DE)

( * ) Notice: Subject to any disclaimer, the term of this patent is extended or adjusted under 35 U.S.C. 154(b) by 617 days.

(21) Appl. No.: 13/686,065

(22) Filed: Nov. 27, 2012

(65) Prior Publication Data
US 2013/0136902 A1    May 30, 2013

Related U.S. Application Data

(60) Provisional application No. 61/563,852, filed on Nov. 28, 2011.

(51) Int. Cl.
| | |
|---|---|
| *B29C 65/70* | (2006.01) |
| *B32B 5/26* | (2006.01) |
| *B32B 5/02* | (2006.01) |
| *B32B 5/28* | (2006.01) |
| *B32B 1/00* | (2006.01) |
| *C08J 5/24* | (2006.01) |

(52) U.S. Cl.
CPC ................ *B29C 65/70* (2013.01); *B32B 1/00* (2013.01); *B32B 5/022* (2013.01); *B32B 5/26* (2013.01); *B32B 5/28* (2013.01); *C08J 5/24* (2013.01); *B32B 2250/02* (2013.01); *B32B 2250/20* (2013.01); *B32B 2260/023* (2013.01); *B32B 2260/046* (2013.01); *B32B 2262/065* (2013.01); *B32B 2307/54* (2013.01); *B32B 2307/558* (2013.01); *B32B 2307/718* (2013.01); *B32B 2451/00* (2013.01); *B32B 2605/08* (2013.01); *C08J 2333/02* (2013.01); *Y10T 428/24802* (2015.01); *Y10T 428/249921* (2015.04)

(58) Field of Classification Search
CPC .... B32B 3/00; B32B 3/10; B32B 1/00; B32B 2250/02; B32B 2262/065; B32B 5/26; B32B 5/24; B32B 5/022; B32B 5/28; B32B 2250/20; B32B 2307/54; B32B 2307/558; B32B 2605/08; B29C 43/20; B29C 65/02; B29C 65/70; B29C 65/18; B29C 66/7392; B29C 66/7394; B29C 66/739; B29C 66/8322; Y10T 428/24802; Y10T 428/249921; C08J 5/24; C08J 2333/02

USPC ....................................... 156/243; 428/195.1
See application file for complete search history.

(56) References Cited

U.S. PATENT DOCUMENTS

| | | | |
|---|---|---|---|
| 4,581,432 A * | 4/1986 | Blum ................. | C08G 18/6505 252/183.12 |
| 5,007,976 A | 4/1991 | Satterfield et al. | |
| 5,652,047 A * | 7/1997 | Hesse et al. ................... | 442/327 |
| 6,695,939 B1 * | 2/2004 | Nakamura et al. .......... | 156/62.8 |
| 2004/0185220 A1 | 9/2004 | Peruzzo | |
| 2006/0013996 A1 * | 1/2006 | Koyama ................. | B32B 5/022 428/138 |
| 2008/0001429 A1 * | 1/2008 | Willis .................... | B29C 70/305 296/181.2 |
| 2008/0179790 A1 * | 7/2008 | Wong et al. .................. | 264/325 |
| 2010/0143650 A1 | 6/2010 | Tsai et al. | |
| 2011/0215603 A1 * | 9/2011 | Gutt ....................... | B29C 43/146 296/1.08 |
| 2011/0250807 A1 * | 10/2011 | Kalbe ........................... | 442/181 |

FOREIGN PATENT DOCUMENTS

| | | | |
|---|---|---|---|
| EP | 0 882 093 B1 | | 9/1999 |
| EP | 1 459 880 A1 | | 9/2004 |
| GB | 2471096 | * | 12/2010 |
| JP | 60-224531 | * | 11/1985 |
| WO | WO2005-009721 | * | 2/2005 |

OTHER PUBLICATIONS

European Search Report dated Mar. 12, 2013, in Patent Application No. EP 12 19 2723 (with English Translation of Categories of Cited Documents).

* cited by examiner

*Primary Examiner* — Camie S Thompson
(74) *Attorney, Agent, or Firm* — Oblon, McClelland, Maier & Neustadt, L.L.P.

(57) ABSTRACT

The invention relates to a process for producing fiber composite moldings comprising
(i) a thermally crosslinkable fiber composite layer as backing layer, and
(ii) a thermoplastic fiber composite layer as overlayer,
by mutually superposing the fiber composite layer (i) comprising a thermally crosslinkable binder in the unhardened state and the thermoplastic overlayer (ii), and, in a molding press, converting them to the desired form and thermally crosslinking the same, which comprises a higher temperature of the first contact area of the molding press, where this has contact with the backing layer, than of the second contact area of the molding press, where this is in contact with the overlayer.

22 Claims, No Drawings

PROCESS FOR PRODUCING FIBER COMPOSITE MOLDINGS

DESCRIPTION

The invention relates to a process for producing fiber composite moldings, to the fiber composite moldings themselves, and to use of these in motor vehicle construction.

Moldings for motor vehicle construction are often produced via cold pressing of natural fiber composite layers bound by thermoplastic with a thermoplastic decorative layer. For this, the natural fiber composite layer as backing layer bound by thermoplastic is heated by means of infrared radiation to a temperature of from 180 to 200° C., placed in a cold molding press together with the decorative layer, and cold-pressed with the decorative layer. The natural fiber composite layer can by way of example comprise polypropylene fibers as thermoplastic binder.

A disadvantage of these purely thermoplastic systems is that the weight per unit area of the backing layer and therefore of the entire laminate has to be high in order to achieve the mechanical properties (modulus of elasticity) demanded.

As an alternative to this it is possible to use natural fiber composite layers bound by thermoset, for example bound by an epoxy resin. Here, a molding is first produced via hot pressing and then an adhesive is applied to this, and a decorative layer is applied by lamination.

Each of the processes of the prior art comprises a plurality of steps, such as use of infrared radiation to preheat the backing layer and pressing with the decorative layer, or production of the backing layer via hot pressing and subsequent application of the decorative layer by lamination.

It is an object of the invention to provide a process which is simple to carry out for producing fiber composite moldings and in which shaping and bonding of the backing layer to the decorative layer take place in one operation.

The object is achieved via a process for producing fiber composite moldings comprising
(i) a thermally crosslinkable fiber composite layer as backing layer, and
(ii) a thermoplastic fiber composite layer as overlayer,
by mutually superposing the fiber composite layer (i) comprising a thermally crosslinkable binder in the unhardened state and the thermoplastic overlayer (ii), and, in a molding press, converting them to the desired form and thermally crosslinking the same, which comprises a higher temperature of the first contact area of the molding press, where this has contact with the backing layer, than of the second contact area of the molding press, where this is in contact with the overlayer.

The second, thermoplastic overlayer (ii) comprises a thermoplastic material, for example a thermoplastic fiber. By way of example, the overlayer (ii) can be a fiber composite layer made of natural fibers and of thermoplastic synthetic fibers, for example polypropylene fibers. The thermoplastic overlayer (ii) can also be a fiber composite layer which comprises a film-forming thermoplastic binder. The thermoplastic overlayer (ii) can moreover comprise an additive which has a slight crosslinking effect.

The overlayer often functions as a decorative layer and is often heat-sensitive.

The fibers comprised in the fiber composite layers (i) and (ii) can be exclusively synthetic fibers. The fiber composite layers preferably comprise natural fibers. Examples of natural fibers which can be comprised in the fiber composite layers are fibers of wood, cotton, sisal, flax, kenaf, hemp, linseed, and jute. Preferred fibers for the overlayer or decorative layer (ii) are flax, hemp, and kenaf.

The fiber composite layers (i) and (ii) very generally take the form of a textile sheet. Nonwovens (staple fibers or spun nonwovens) are particularly suitable, but wovens and knits can also be used. Nonwovens made of natural fibers are preferred, examples being nonwovens made of flax, hemp, and kenaf.

The natural fibers can be present in a mixture with synthetic fibers, for example in a mixture with fibers made of polypropylene, polyethylene, polyester, polyamide, or poly-acrylonitrile. The proportion of synthetic fibers can be up to 50% by weight, preferably being up to 30% by weight and particularly preferably being up to 10% by weight. In one embodiment to which particular preference is given, no synthetic fibers are present alongside the natural fibers.

In another embodiment of the invention, the fiber composite layers (i) or (ii) comprise exclusively synthetic fibers, for example the abovementioned synthetic fibers, or polyester fibers made of PET or PBT.

The nonwovens can have been prebonded mechanically, thermally, or chemically. Thermally prebonded nonwovens can by way of example be obtained via concomitant use of synthetic binder fibers and heat treatment in a calender.

The fiber composite layer (i) which functions as backing layer preferably comprises natural fibers made of wood, flax, hemp, and kenaf.

The fiber composite layer (ii) which functions as overlayer preferably comprises natural fibers made of flax, kenaf, hemp, sisal and cotton.

The overlayer is often simultaneously a decorative layer made of heat-sensitive material. Examples of heat-sensitive decorative layers are layers made of synthetic and natural fiber mixtures.

The nonwovens, wovens, and knits of the backing layer are impregnated with a thermally crosslinkable binder. Suitable thermally crosslinkable binders are binders based on crosslinkable polyacrylic acids, acrylic acid/maleic acid copolymers, formaldehyde resins, such as urea-formaldehyde resins (UF resins), phenol-formaldehyde resins (PF resins), melamine-formaldehyde resins (MF resins), and melamine-urea-formaldehyde resins (MUF resins), and also crosslinkable aqueous dispersions, such as crosslinkable styrene-butadiene dispersions, styrene-acrylate dispersions, and straight acrylate dispersions.

Preferred thermoset binders are thermally crosslinkable polyacrylic acid, acrylic acid/maleic acid copolymers, thermally crosslinkable polyurethanes, and thermally crosslinkable epoxy resins.

In one particularly preferred embodiment of the invention, binders used for the nonwovens, wovens, and knits comprise thermally crosslinkable binders based on acrylic acid/maleic acid copolymers and triethanolamine as crosslinking agent, as are as described by way of example in EP 0 882 093 B1.

The backing layer is generally prebonded with a thermoset binder and used in unhardened form. The backing layer thus has high flexibility and is readily formable.

The overlayer preferably comprises a thermoplastic binder. Examples are film-forming thermoplastic polyurethane dispersions, styrene-acrylate dispersions, and straight acrylate dispersions. It is also possible to use thermoplastic synthetic fibers, such as polypropylene fibers, as thermoplastic binder.

A decorative layer made of thermoplastic material, for example a decorative foil made of PVC or polyolefin, can be applied as further layer by lamination to the overlayer. However, the overlayer (ii) can also assume the function of the decorative layer.

Use of a thermoset binder can reduce the thickness, and therefore the weight per unit area, of the backing layer and thus of the entire laminate made of backing layer and overlayer, in comparison with a purely thermoplastic laminate.

The weight per unit area of the backing layer in the dry, unhardened state is generally from 500 to 1500 g/m², preferably from 600 to 1000 g/m². The weight per unit area of the overlayer in the dry state is generally from 50 to 1500, preferably from 200 to 600 g/m².

The fiber composite moldings of the invention are produced by subjecting the laminate to a thermal forming process and thermally crosslinking the binder. For this, the backing layer in the unhardened state and the overlayer are mutually superposed and, in a heated press, converted to the desired three-dimensional form, where the backing layer (i) is thermally crosslinked. The hardening of the backing layer (i) here takes place in the heated press.

In the invention, the temperature of the first contact area of the molding press, where this has contact with the backing layer, is higher than that of the second contact area of the molding press, where this is in contact with the overlayer. Thermosetting of the backing layer is thus possible without damaging the more heat-sensitive overlayer.

The temperature of the first contact area of the molding press is generally in the range from 150 to 250° C., and the temperature of the second contact area of the molding press is generally in the range from 20 to 180° C. It is preferable that the temperature of the first contact area of the molding press is within the range from 170 to 220° C. and that the temperature of the second contact area of the molding press is in the range from 100 to 170° C.

The temperature of the first contact area is generally higher by at least 20° C., preferably by at least 30° C., than that of the second contact area of the molding press. This temperature difference is preferably from 20 to 80° C., with particular preference from 30 to 70° C.

The weight per unit area of the resultant laminate is generally from 1000 to 2000 g/m², preferably from 1200 to 1600 g/m². The Charpy impact resistance (to ISO 179) is generally from 8 to 30 kJ/m², preferably from 15 to 25 kJ/m². The modulus of elasticity (to DIN 14125) is generally from 2500 to 9000 N/mm², preferably from 4000 to 8000 N/mm².

The ratio of the weights per unit area of backing layer to overlayer is generally in the range from 5:1 to 2:1, preferably from 4:1 to 2.5:1, for example about 3:1.

By virtue of the laminate made of thermoset backing layer and of thermoplastic overlayer, it is possible to adjust modulus of elasticity and impact resistance almost independently of one another. Furthermore, only one operation is required for the shaping and bonding of the backing layer to the decorative layer.

The invention therefore also provides the resultant fiber composite moldings themselves. In one embodiment, these take the form of components for interiors of motor vehicles, for example taking the form of door supports, center consoles, instrument panels, seat-backrest cladding, parcel shelves, and the like, and are used as such in motor vehicle construction.

EXAMPLES

Natural fiber composite sheaths with an Emuldur®-bonded overlayer for improving mechanical properties.

Inventive Example 1

Production of a sandwich structure made of an Acrodur®-bonded natural fiber nonwoven as backing and of an Emuldur®-bonded lower-weight overlayer.

Inventive Example 1a

Impregnation of a Natural Fiber Mat to Produce Backing

Natural fiber mat: hemp/kenaf 30:70 with weight per unit area of 1000 g/m², binder: Acrodur® DS 3515 (acrylic acid/maleic acid copolymer with triethanolamine as crosslinking agent)
Binder concentration: 50% by weight in water
Binder application rate: specified as 28%, based on dry mass
Binder density (foam): from 450 to 500 g/L The nonwovens for impregnation are cut to a size of 34×28 cm, and weighed. A corresponding amount of binder is prepared in a Kenwood Major mixer and foamed by agitation to a density of from 450 to 500 g/L. The density of the foam is checked by using a beaker of volume 100 cm³. The beaker is tared, and then completely filled with the foam, and again weighed.

To determine the weight of the foam, the value read on the balance is multiplied by ten. The resultant stable foam is applied to the mat by using a horizontally operated HVF roll mill from Mathis. For this, the rolls are brought together until a defined separation is reached and are subjected to a counterpressure of from 4 to 6 bar. The binder foam is charged to the nip, and the rolls are driven at a velocity of 2 m/min. The pieces of mat for impregnation are introduced vertically into the gap from above and are transported through the gap by the rotating rolls. The binder is thus forced uniformly into both sides of the mat. The amount applied can be adjusted by adjustment of the gap and of the pressure applied.

The resultant semifinished product—natural fiber mat and binder—is weighed, and the amount of wet binder absorbed is determined. The product is dried at a temperature of 90° C. in a convection drying oven until the residual moisture level is 17%.

Inventive Example 1b

Impregnation of a Natural Fiber Mat to Produce the Overlayer

Natural fiber mat: 100% flax with a weight per unit area of 220 g/m²
Binder: Emuldur® (thermoplastic polyurethane dispersion)
Binder concentration: 40% in water
Binder application rate: specified as 25%, based on dry mass
Binder density: unfoamed material As described above, but the unfoamed binder is charged to the roll mill nip. The two rolls have been brought together so as to be in contact. The pressure applied to the rolls is 4 bar. After determination of the amount applied, these semifinished products are dried to a residual moisture level of 0%.

Inventive Example 1c

Production of the Sandwich Structure Made of Backing and Overlayer

A backing nonwoven and an overlayer, each in 34×28 cm format, are pressed in one step in a press from Vogt to give a component of thickness 2.2 mm. The temperature of the contact area for the backing is 200° C., and the temperature of the area for the Emuldur®-bonded surface is 150° C. The materials are pressed for 45 seconds after an aeration cycle lasting 5 seconds, the pressures applied to the areas being about 30 bar. The resultant sheet can be removed in dimensionally stable form without any sticking.

Comparative Example

Backing Layer without Overlayer

For comparison, a natural fiber mat made of hemp/kenaf in the ratio 30:70 was coated using a weight per unit area of 1000 g/m² as in inventive example 1a, and dried, and pressed as described in inventive example 1c, but without overlayer.

Inventive Example 2

Determination of Mechanical Properties

To determine mechanical properties, appropriate test specimens were prepared and were tested after 24 hours of aging under standard conditions of temperature and humidity. The structure according to the invention gives markedly higher impact resistance values without any alteration of high modulus of elasticity. The following properties were found for a component density of 0.9 g/cm³ and a thickness of 1.8 mm:
Impact resistance [Charpy ISO 179]
Comparative example=9 kJ/m²
Novel sandwich structure=25 kJ/m²
Modulus of elasticity [DIN 14125]
Comparative example=4500 N/mm²
Novel sandwich structure=4700 N/mm²
Water absorption [DIN 52364] after 24 hours
Comparative example=45%
Novel sandwich structure=30%
Swelling [DIN 52364] after 24 hours
Comparative example=26%
Novel sandwich structure=10%

The invention claimed is:

1. A process for producing a fiber composite molding, wherein the fiber composite molding comprises:
   (i) a thermally crosslinkable fiber composite layer as a backing layer, wherein the thermally crosslinkable fiber composite layer (i) comprises fibers and a thermally crosslinkable binder, and
   (ii) a thermoplastic fiber composite layer as an overlayer, wherein the thermoplastic fiber composite layer (ii) comprises fibers and a thermoplastic binder,
   wherein the process comprises mutually superposing the fiber composite layer (i) comprising a thermally crosslinkable binder in an unhardened state and the thermoplastic fiber composite layer (ii), and, in a molding press, converting them in one step to the desired form and thermally crosslinking the same,
   wherein
      the molding press has a first contact area and a second contact area,
      the first contact area of the molding press is in contact with the thermally crosslinkable fiber composite layer (i),
      the second contact layer of the molding press is in contact with the thermoplastic fiber composite layer (ii),
      the first contact area of the molding press has a higher temperature than the second contact area of the molding press,
      the thermally crosslinkable fiber composite layer (i) and the thermoplastic fiber composite layer (ii) are in direct contact with each other,
      the temperature of the first contact area of the molding press is in the range from 170 to 220° C.,
      the temperature of the second contact area of the molding press is in the range from 100 to 170° C., and
      the temperature of the first contact area of the molding press is higher by at least 30° C. than that of the second contact area of the molding press.

2. The process according to claim 1, wherein the thermally crosslinkable fiber composite layer (i) comprises natural fibers.

3. The process according to claim 1 or 2, wherein the thermoplastic overlayer (ii) comprises natural fibers.

4. The process according to claim 2, wherein the natural fibers have been selected from the fibers of wood, cotton, sisal, flax, hemp, linseed, kenaf, and jute.

5. The process according to claim 1 or 2, wherein the thermally crosslinkable binder of the thermally crosslinkable fiber composite layer (i) is a thermoset binder.

6. The process according to claim 5, wherein the thermoset binder is selected from thermally crosslinkable acrylic acid, thermally crosslinkable acrylic acid/maleic acid copolymers, thermally crosslinkable polyurethanes, and thermally crosslinkable epoxy resins.

7. The process according to claim 1 or 2, wherein the overlayer (ii) is a temperature-sensitive decorative layer.

8. The process according to claim 1 or 2, wherein an additional decorative layer (iii) is laminated onto the overlayer (ii) opposite to the thermally crosslinkable fiber composite layer (i).

9. The process according to claim 1 or 2, wherein the weight per unit area of the backing layer (i) in the dry, unhardened state is in the range from 600 to 1000 g/m², and the weight per unit area of the overlayer (ii) in the dry state is in the range from 200 to 600 g/m².

10. The process according to claim 1, wherein the thermoplastic fiber composite layer (ii) comprises polypropylene fibers.

11. The process according to claim 1, wherein thermally crosslinkable fiber composite layer (i) comprises at least one fiber selected from the group consisting of wood fibers, cotton fibers, sisal fibers, flax fibers, kenaf fibers, hemp fibers, linseed fibers and jute fibers.

12. The process according to claim 1, wherein the thermoplastic fiber composite layer (ii) comprises at least one fiber selected from the group consisting of flax fibers, hemp fibers and kenaf fibers.

13. The process according to claim 1, wherein thermally crosslinkable fiber composite layer (i) comprises at least one fiber selected from the group consisting of wood fibers, flax fibers, kenaf fibers and hemp fibers.

14. The process according to claim 1, wherein the thermoplastic fiber composite layer (ii) comprises at least one fiber selected from the group consisting of flax fibers, hemp fibers, kenaf fibers, cotton fibers and sisal fibers.

15. The process according to claim 1, wherein the thermoplastic binder is selected from the group consisting of film-forming thermoplastic polyurethane dispersions, styrene-acrylate dispersions, and straight acrylate dispersions.

16. The process according to claim 1, wherein the temperature of the first contact area of the molding press is higher by at 30° C. to 70° C. than that of the second contact area of the molding press.

17. The process according to claim 1, wherein the fiber composite molding has a weight per unit area from 1000 to 2000 g/m$^2$.

18. The process according to claim 1, wherein the fiber composite molding has a modulus of elasticity of from 2500 to 9000 N/mm$^2$.

19. The process according to claim 1, wherein the weight ratio of (i) to (ii) in the fiber composite molding is 5:1 to 2:1.

20. The process according to claim 1, wherein the thermally crosslinkable binder of the thermally crosslinkable fiber composite layer (i) is a thermoset binder and comprises a thermally crosslinkable acrylic acid/maleic acid copolymer.

21. The process according to claim 20, wherein the thermally crosslinkable binder of the thermally crosslinkable fiber composite layer (i) comprises the thermally crosslinkable acrylic acid/maleic acid copolymer and triethanolamine as a crosslinking agent.

22. A process for producing a fiber composite molding, wherein the fiber composite molding comprises:
(i) a thermally crosslinkable fiber composite layer as a backing layer, wherein the thermally crosslinkable fiber composite layer (i) comprises fibers and a thermally crosslinkable binder, and
(ii) a thermoplastic fiber composite layer as an overlayer, wherein the thermoplastic fiber composite layer (ii) comprises fibers and a thermoplastic binder,
wherein the process comprises mutually superposing the fiber composite layer (i) comprising a thermally crosslinkable binder in an unhardened state and the thermoplastic fiber composite layer (ii), and, in a molding press, converting them in one step to the desired form and thermally crosslinking the same,
wherein
the thermally crosslinkable binder of the thermally crosslinkable fiber composite layer (i) is a thermally crosslinkable acrylic acid/maleic acid copolymer,
the molding press has a first contact area and a second contact area,
the first contact area of the molding press is in contact with the thermally crosslinkable fiber composite layer (i),
the second contact layer of the molding press is in contact with the thermoplastic fiber composite layer (ii),
the first contact area of the molding press has a higher temperature than the second contact area of the molding press,
the thermally crosslinkable fiber composite layer (i) and the thermoplastic fiber composite layer (ii) are in direct contact with each other,
the temperature of the first contact area of the molding press is in the range from 170 to 220° C.,
the temperature of the second contact area of the molding press is in the range from 100 to 170° C., and
the temperature of the first contact area of the molding press is higher by at least 30° C. than that of the second contact area of the molding press.

\* \* \* \* \*